United States Patent [19]

Gunji et al.

[11] Patent Number: 5,376,194
[45] Date of Patent: Dec. 27, 1994

[54] SLIDE SURFACE CONSTRUCTION HAVING ORIENTED F.C.C. METAL LAYER

[75] Inventors: Takahiro Gunji; Yoshikazu Fujisawa; Kazuhisa Okamoto; Masamune Tabata, all of Saitama, Japan

[73] Assignee: Honda Giken Kogyo Kabushiki Kaisha, Tokyo, Japan

[21] Appl. No.: 162,424

[22] Filed: Dec. 3, 1993

[30] Foreign Application Priority Data

Dec. 3, 1992 [JP] Japan .................. 4-350298

[51] Int. Cl.$^5$ .................. F16C 17/00; F16C 25/00; F16C 33/00
[52] U.S. Cl. .................. 148/426; 428/653
[58] Field of Search .................. 148/426; 428/653

[56] References Cited

U.S. PATENT DOCUMENTS

| | | | |
|---|---|---|---|
| 3,982,973 | 9/1976 | Peters et al. | 148/426 |
| 4,610,932 | 9/1986 | Haynes et al. | 428/680 |
| 4,702,782 | 10/1987 | Chin | 148/426 |
| 4,717,630 | 1/1988 | Hamakawa et al. | 428/680 |
| 4,900,639 | 2/1990 | Hodes et al. | 428/653 |
| 4,934,968 | 6/1990 | Davies et al. | 428/680 |
| 5,034,284 | 7/1991 | Bornstein et al. | 428/680 |
| 5,045,405 | 9/1991 | Koroschetz et al. | 428/653 |
| 5,310,606 | 5/1994 | Fujiwara et al. | 428/645 |

FOREIGN PATENT DOCUMENTS 2129014 5/1984 United Kingdom .................. 148/426

Primary Examiner—Upendra Roy
Attorney, Agent, or Firm—Lyon & Lyon

[57] ABSTRACT

A slide surface construction is formed of an aggregate of Ni crystals having a face-centered cubic structure. The aggregate includes {311} oriented Ni crystals with their {311} planes (by Miller indices) oriented toward a slide surface. The content S of the {311} oriented Ni crystals is set in a range represented by S≧40%. The {311} oriented Ni crystals are of a quadrangular pyramid shape on the slide surface, and provide good oil retention for the slide surface construction. Thus, the slide surface construction exhibits an excellent seizure resistance.

4 Claims, 11 Drawing Sheets ure generating load;
SLIDE SURFACE CONSTRUCTION HAVING ORIENTED F.C.C. METAL LAYER

BACKGROUND OF THE INVENTION

1. Field of the Invention

The present invention relates to a slide surface construction constituting a slide surface for a mating member.

2. Description of the Prior Art

An example of such conventionally known slide surface construction is a Ni-plated layer which is formed around an outer peripheral surface of a journal portion of a base material in a cam shaft for an internal combustion engine in order to improve seizure and wear resistances.

However, under existing circumstances where speed and output of the internal combustion engine have tended to increase, the prior art slide surface constructions suffer from the problems of insufficient oil-retaining property, i.e., oil retention, and a poor initial conformability, resulting in a poor seizure resistance, and also suffer from the problem of an increased amount of wear of the bearing member which is the mating member.

SUMMARY OF THE INVENTION

It is an object of the present invention to provide a slide surface construction of the type described above, which has an oil retention and an initial conformability required for an improvement in seizure resistance, by specifying the crystal structure, and which also has a wear resistance and ensures that the wear of a mating member can be suppressed.

To achieve the above object, according to the present invention, there is provided a slide surface construction, which is formed of an aggregate of metal crystals having a face-centered cubic structure, the aggregate including (3hhh) oriented metal crystals with their (3hhh) planes (by Miller indices) oriented toward a slide surface. The content S of the (3hhh) oriented metal crystals being in a range represented by $S \geq 40\%$.

In the aggregate of the metal crystals having the face-centered cubic structure, the (3hhh) oriented metal crystals with their (3hhh) planes (by Miller indices) oriented toward the slide surface are grown into a columnar form and are of a pyramid or truncated pyramid shape. Thereupon, if the content S of the (3hhh) oriented metal crystals is set in the above range, adjacent (3hhh) oriented metal crystals are in mutually biting states and as a result, the slide surface takes on an intricate morphology comprising a large number of crests, a large number of valleys formed between the crests, and a large number of swamps formed by the mutual biting of the crests. Therefore, the slide surface construction has an improved oil retention. In addition, the initial conformability of the slide surface construction is enhanced by the preferential wearing of tip ends of the (3hhh) oriented metal crystals. The seizure resistance of the slide surface construction is enhanced by such oil retention and initial conformability. Moreover, the slide surface construction has good wear resistance and a characteristic of ensuring that the wearing of the mating member is suppressed. However, if the content S of the (3hhh) oriented metal crystals is less than 40%, the morphology of the slide surface tends to be simplified with a decrease in content of the (3hhh) oriented metal crystals, resulting in degraded oil retention and initial conformability of the slide surface construction.

The above and other objects, features and advantages of the invention will become apparent from the following description of a preferred embodiment, taken in conjunction with the accompanying drawings.

DESCRIPTION OF THE PREFERRED EMBODIMENTS

Figure 1:
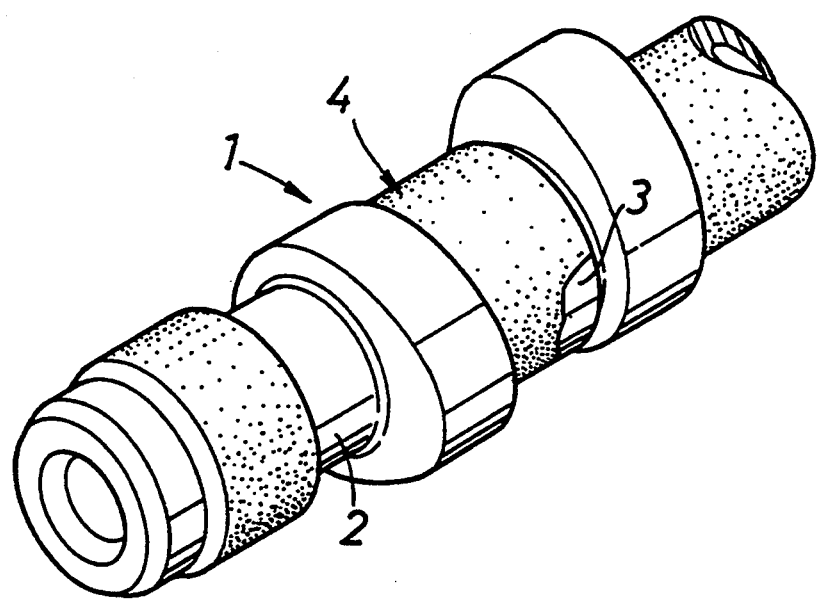
FIG. 1 is a perspective view of an essential portion of a cam shaft.
Figure 2:
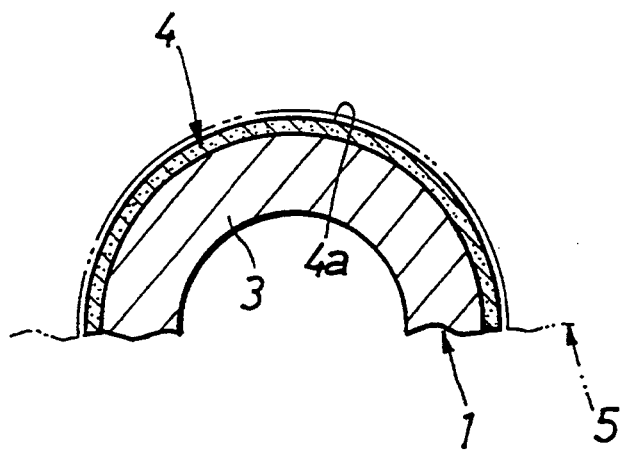
FIG. 2 is a sectional view of an essential portion of a journal portion in the cam shaft.

Referring to FIGS. 1 and 2, a cam shaft 1 for an internal combustion engine includes a base material 2 of cast iron, which has a lamellar slide surface construction 4 formed on an outer peripheral surface of a journal portion 3 thereof by plating.

Figure 3:
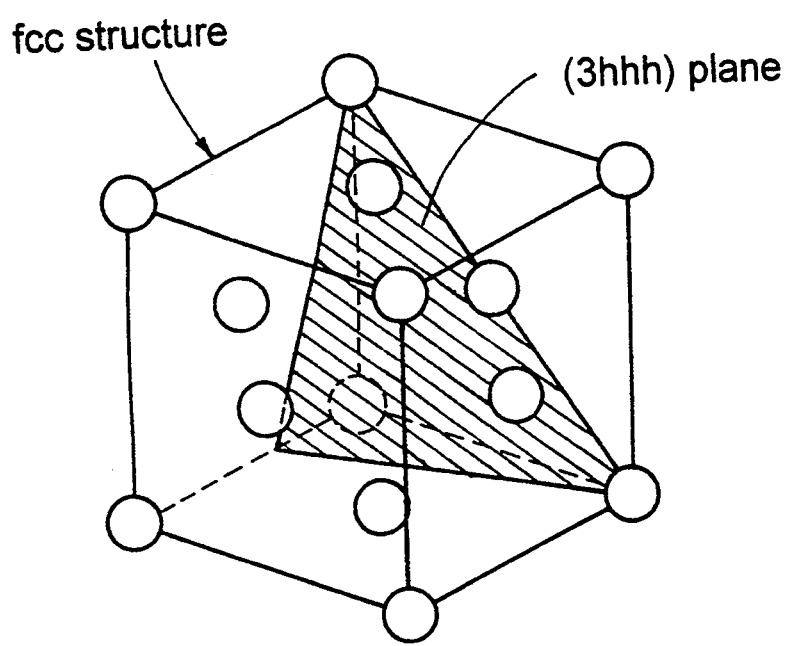
FIG. 3 is a perspective view illustrating a face-centered cubic structure and its (3hhh) plane.

As shown in FIG. 3, the slide surface construction 4 is formed of an aggregate of metal crystals having a face-centered cubic structure (fcc structure). The aggregate includes (3hhh) oriented metal crystals with their (3hhh) plane oriented toward a slide surface 4a for a bearing member 5. The content S of the (3hhh) oriented metal crystals is set in a range represented by $S \geq 40\%$.

Figure 4:
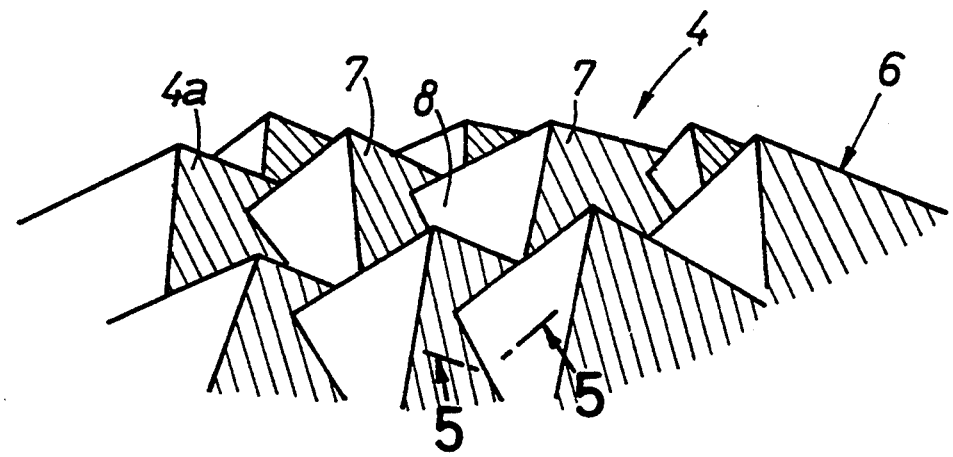
FIG. 4 is a perspective view of an essential portion, illustrating one example of a slide surface construction.
Figure 5:
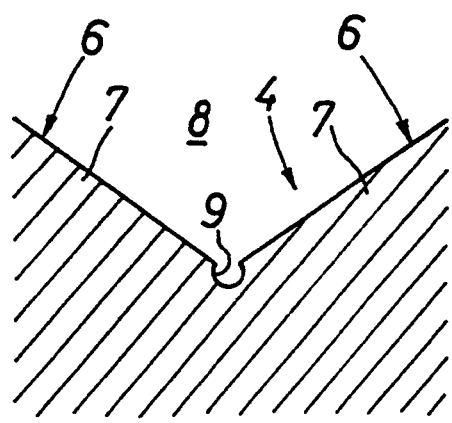
FIG. 5 is a sectional view taken along line 5—5 in FIG. 4.

As shown in FIGS. 4 and 5, the (3hhh) oriented metal crystals are grown into a columnar form from the base material 2 and are of a pyramid or truncated pyramid shape (quadrangular pyramid shape in illustrated embodiment) on the slide surface 4a. Thereupon, if the content S of the (3hhh) oriented metal crystals is set in the above-described range, adjacent (3hhh) oriented metal crystals are in mutually biting states, and, thus, the slide surface 4a takes on an intricate morphology comprising a large number of crests 7, valleys 8 between the crests 7, and a large number of swamps 9 provided by mutual biting of the crests 7. This leads to good oil retention of the slide surface construction 4. The tip ends of the quadrangular pyramid-shaped (3hhh) oriented metal crystals 6 are worn preferentially, thereby providing an improved initial conformability to the slide surface construction 4.

The hardness Hv of the slide surface construction 4 is suitable to be in a range represented by Hv≧230 from viewpoints of the insurance of a wear resistance of the slide surface construction itself and of the suppression of wearing of a mating member. If Hv>230, the amount of wear experienced by the mating member will be increased. The lower limit value of the hardness Hv varies depending upon the material of the mating member. For example, if the mating member is formed of aluminum alloy, a suitable lower limit value of the hardness Hv is about 145.

Figure 6:
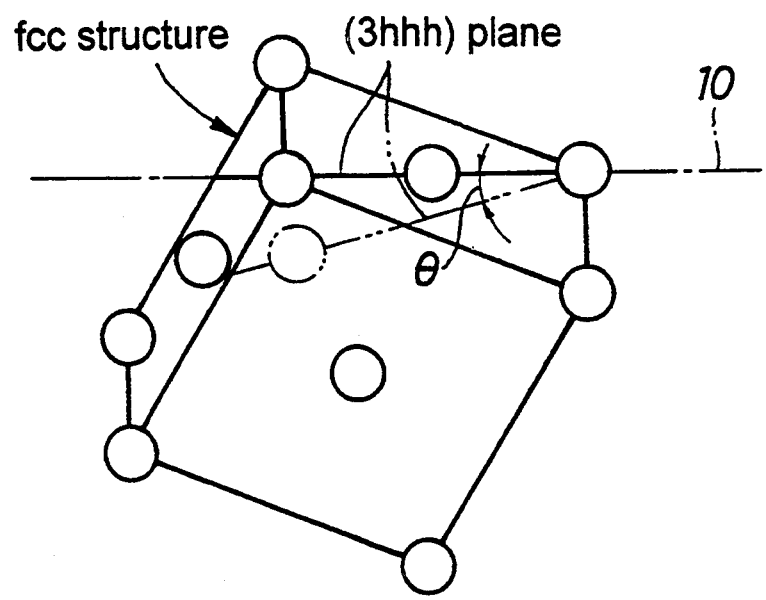
FIG. 6 is a diagram for explaining the inclination of the (3hhh) plane in the face-centered cubic structure.

As shown in FIG. 6, an inclination of the (3hhh) plane with respect to phantom plane 10 along the slide surface 4a appears in the form of a quadrangular pyramid, and hence, an influence is imparted to the oil retention and initial conformability of the slide surface construction 4. Thereupon, the inclination angle $\theta$ formed by the (3hhh) plane with respect to the phantom plane 10 is set in a range represented by $0° \leq \theta \leq 15°$. In this case, the direction of the inclination of the (3hhh) plane is not limited. If the inclination angle is more than 15°, the slide surface construction 4 has a reduced oil retention and a reduced initial conformability.

The metals having the fcc structure include those of simple metals such as Pb, Ni, Cu, Pt, Al, Ag, Au, etc., and the alloys thereof.

In the plating treatment for forming the slide surface construction according to the present invention, basic conditions for the electrolytic deposition of Ni-plating are as given in Tables 1 and 2.

TABLE 1

| Plating bath composition (g/liter) | | |
| --- | --- | --- |
| Nickel sulfide | Nickel chloride | Boric acid |
| 200~400 | 50~150 | 5~50 |

TABLE 2

| | Treating conditions | |
| --- | --- | --- |
| Plating bath pH | Plating bath temperature (°C.) | Cathode current density (A/dm²) |
| 3~6 | 10~70 | 7~12 |

In the electrolytic deposition of the Ni-plating under the above-described conditions, the precipitation and content of (3hhh) oriented Ni crystals are controlled by the cathode current density, the pH of the plating bath and the like.

In addition to electrolytic plating, examples of other plating treatments that may be used include PVD processes, CVD processes, sputtering processes, ion-plating and the like, which are gas-phase plating processes. Conditions for Pt- or Al-plating by a sputtering process are, for example, an Ar pressure of 0.8 to 1 Pa; an Ar acceleration power direct current of 200 to 1,000 watts, and a base material temperature of 80° to 300° C. An example of conditions for Al-plating by a CVD process is as follows: An Al(CH₃)₃ starting material, a gas flow rate of 1 to 10 cc/min., a pressure of 50 to 300 Pa within the chamber, and a base material temperature of 300° to 600° C.

Particular examples will be described below.

A plurality of cam shafts 1 for internal combustion engines were produced by subjecting an outer peripheral surface of a journal portion 3 of a base material 2 of cast iron to an electrolytic Ni-plating process to form a slide surface construction 4 comprised of an aggregate of Ni crystals.

Tables 3 and 4 show conditions for the electrolytic Ni-plating process for examples 1 to 6 of slide surface constructions 4.

TABLE 3

| | Plating bath composition (g/liter) | | |
| --- | --- | --- | --- |
| Example No. | Nickel sulfate | Nickel chloride | Boric acid |
| 1 | 300 | 90 | 30 |
| 2 | 300 | 90 | 30 |
| 3 | 300 | 90 | 30 |
| 4 | 300 | 90 | 30 |
| 5 | 300 | 90 | 30 |
| 6 | 300 | 90 | 30 |

TABLE 4

| | Treating conditions | | |
| --- | --- | --- | --- |
| Example No. | Plating bath pH | Plating bath temperature (°C.) | Cathode current density (a/dm²) |
| 1 | 3.5 | 55 | 10 |
| 2 | 4 | 55 | 10 |
| 3 | 4.15 | 55 | 10 |
| 4 | 4.2 | 55 | 10 |
| 5 | 4 | 55 | 3.5 |
| 6 | 4 | 55 | 3 |

Table 5 shows the crystal shape of the slide surface 4a, the grain size of the Ni crystals, the content S of the oriented Ni crystals, and the hardness.

TABLE 5

| Example No. | Crystalline shape of slide surface | Grain size (μm) | Content of S oriented Ni crystals (%) | | | | Hardness (Hv) |
| --- | --- | --- | --- | --- | --- | --- | --- |
| | | | {111} | {200} | {220} | {311} | |
| 1 | QP* | about 2 | 17.3 | 5.1 | 2.6 | 75 | 200 |
| 2 | QP* | about 2 | 22.3 | 9.7 | 3.2 | 64.8 | 205 |
| 3 | QP* | about 2 | 31.7 | 12 | 5.4 | 50.9 | 224 |
| 4 | QP* fine grain | about 2 about 0.5 | 33 | 16.1 | 10.5 | 40.4 | 222 |
| 5 | IQP* | about 2 | 26 | 11 | 32.6 | 30.4 | 250 |
| 6 | IQP* | about 3 | 18.2 | 11.5 | 50.3 | 20 | 300 |

QP* = quadrangular pyramid
IQP* = imperfect quadrangular pyramid

Figure 7:
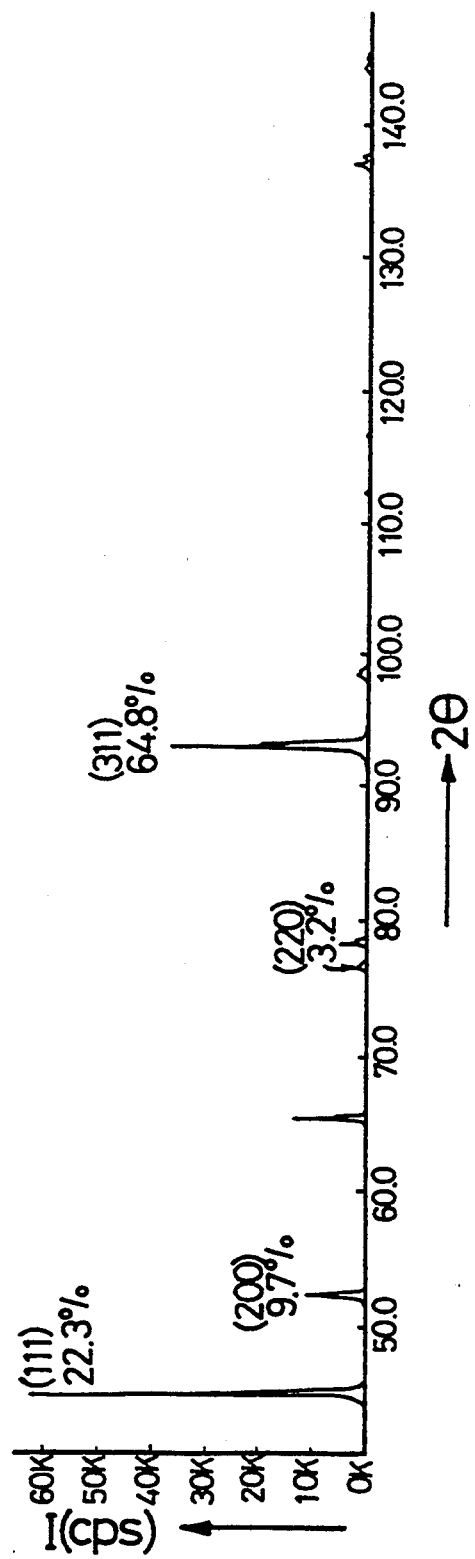
FIG. 7 is an X-ray diffraction pattern for one example of the slide surface construction.

The content S was determined in the following manner on the basis of X-ray diffraction patterns (application of the X-ray beam was in a direction perpendicular to the slide surface 4a) for Examples 1 to 6. Example 2 will be described below. FIG. 7 is an X-ray diffraction pattern for Example 2. The content S for each of the oriented Ni crystals were determined from the following expressions:

{111} oriented Ni crystals: $S_{111} = \{(I_{11-1}/IA_{111})T\} \times 100$

{200} oriented Ni crystals: $S_{200} = \{(I_{200}/IA_{200})T\} \times 100$

{220} oriented Ni crystals: $S_{220} = \{(I_{220}/IA_{220})T\} \times 100$

{311} oriented Ni crystals: $S_{311} = \{(I_{311}/IA_{311})T\} \times 100$ wherein each of $I_{111}$, $I_{200}$, $I_{220}$ and $I_{311}$ is a measurement (cps) of the intensity of X-rays reflected from each crystal plane; and each of $IA_{111}$, $IA_{200}$, $IA_{220}$ and $IA_{311}$ is an intensity ratio of X-rays reflected from each crystal plane in an ASTM card. Further. $IA_{111} = 100$, $IA_{200} = 42$, $IA_{220} = 21$ and $IA_{311} = 20$; and $T = (I_{11-1}/IA_{111}) + (I_{200}/IA_{200}) + (I_{220}/IA_{220}) + (I_{311}/IA_{311})$.

Figure 8:
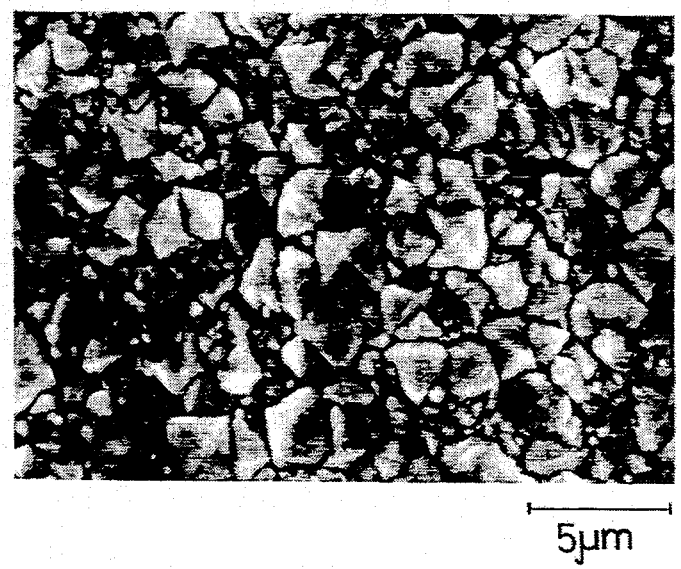
FIG. 8 is a photomicrograph showing the crystal structure of a slide surface in one example of the slide surface construction.

FIG. 8 is a photomicrograph showing the crystal structure of the slide surface 4a in Example 2. In FIG. 8, a large number of quadrangular pyramid-shaped (3hhh) oriented Ni crystals are observed. The (3hhh) oriented Ni crystals are {311} oriented Ni crystals with their (3hhh) planes, i.e., {311} planes oriented toward the slide surface 4a. The content S of the {311} oriented Ni crystals is equal to 64.8%, as shown in Table 5 and FIG. 7.

Figure 9:
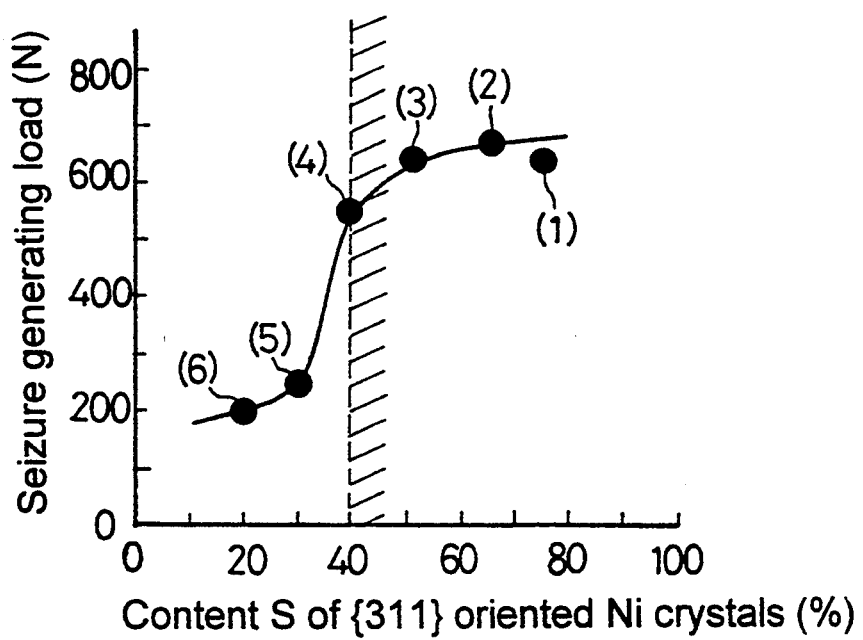
FIG. 9 is a graph illustrating the relationship between the content S of (311) oriented Ni crystals and the seizure generating load.

A seizure test was carried out in a chip-on-disk manner under lubrication for Examples 1 to 6 to determine the relationship between the content S of {311} oriented Ni crystals and the seizure generating load, thereby providing the results shown in Table 6 and FIG. 9. Conditions for the test were as follows: the material of the disk was an AL-10% by weight of Si alloy; the rotational speed of the disk was 15 m/sec.; the amount of oil supplied was 0.3 ml/min.; and the area of the slide surface of the chip made from the slide surface construction was 1 cm².

TABLE 6

| Example No. | Seizure generating load (N) |
| --- | --- |
| 1 | 650 |
| 2 | 680 |
| 3 | 650 |
| 4 | 550 |
| 5 | 250 |
| 6 | 200 |

FIG. 9 is a graph taken from Table 6, wherein points (1) to (6) correspond to Example 1 to 6, respectively. As apparent from Table 6 and FIG. 9, in each of Examples 1 to 4 with the content S of the {311} oriented Ni crystals being in a range represented by $S \geq 40\%$, the slide surface 4a has an improved oil retention and an improved initial conformability. Hence, the seizure generating load is increased substantially, as compared with Examples 5 and 6.

Figure 10:
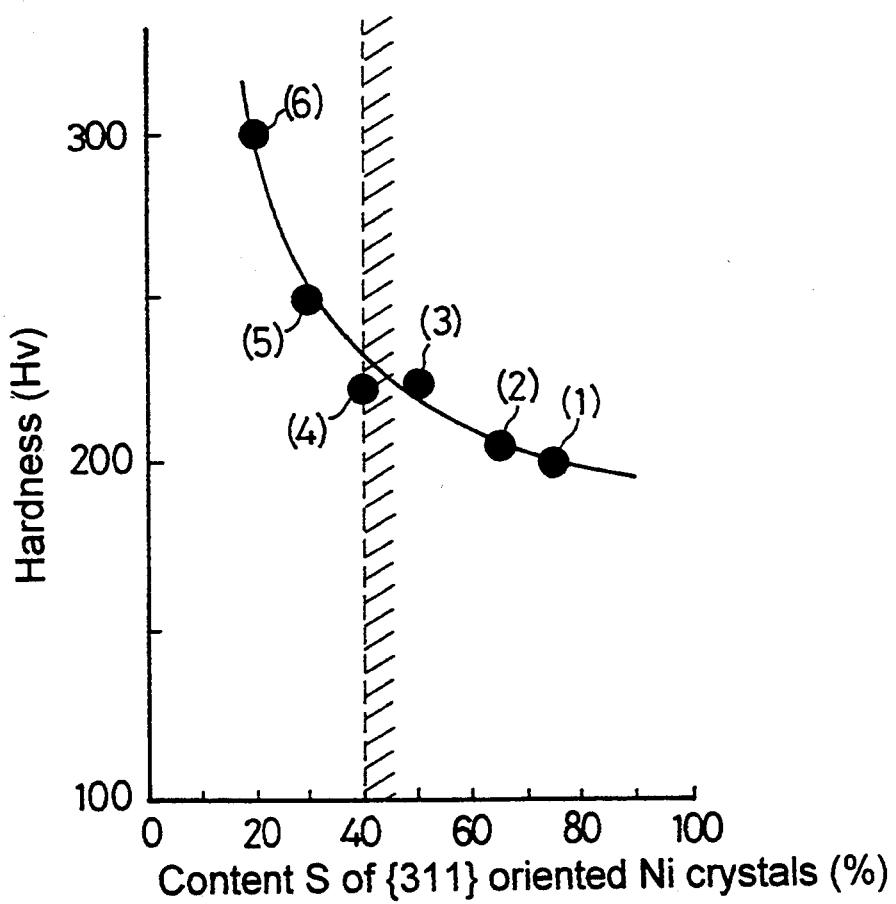
FIG. 10 is a graph illustrating the relationship between the content S of (311) oriented Ni crystals and the hardness.

FIG. 10 is a graph taken from Table 5 to illustrate the relationship between the content S of the {311} oriented Ni crystals and the hardness for Examples 1 to 6. In FIG. 10, points (1) to (6) correspond to Examples 1 to 6, respectively. It can be seen from FIG. 10 that the hardness of the slide surface construction is decreased, as the content S of the {311} oriented Ni crystals is increased.

Figure 11:
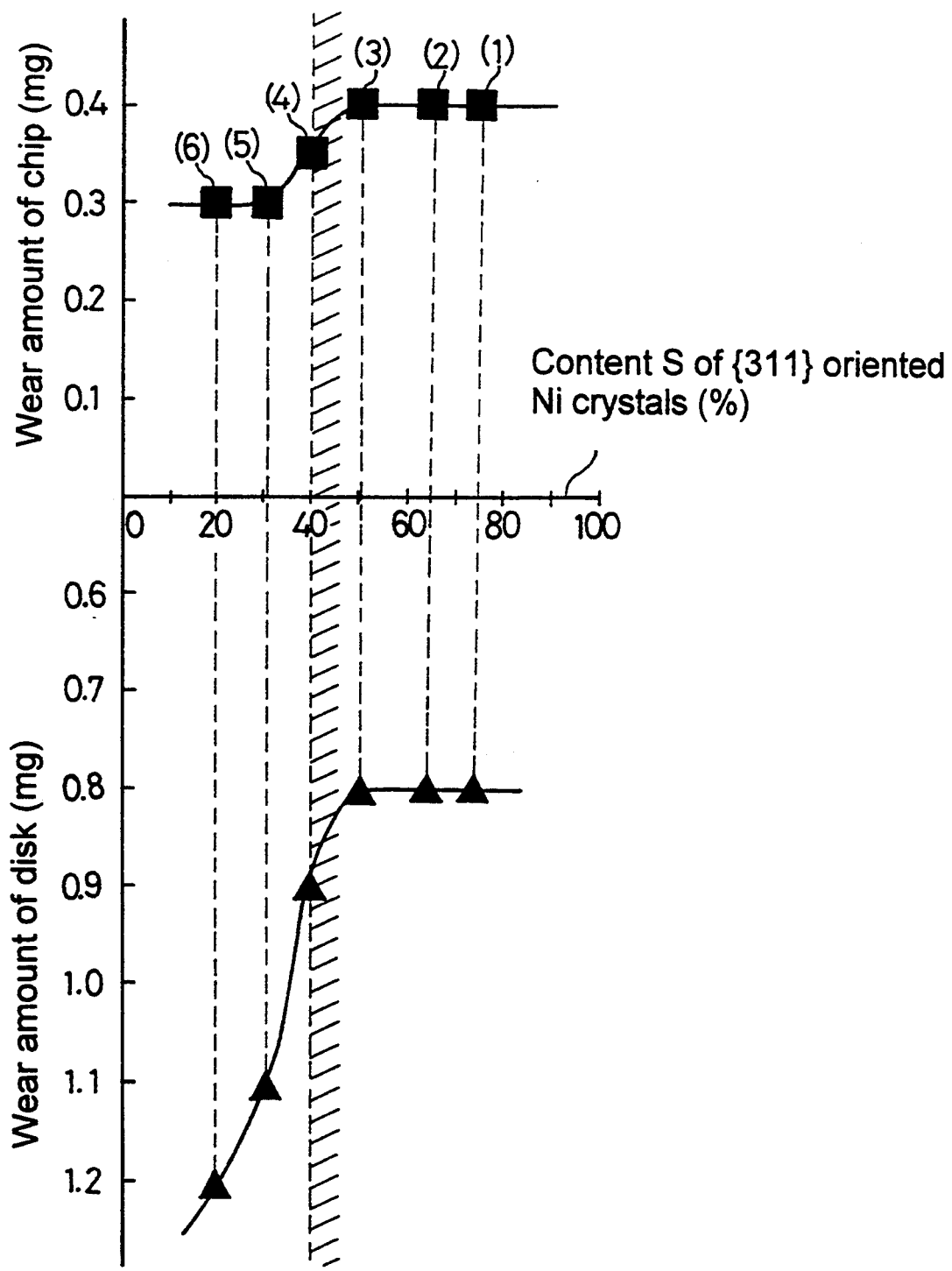
FIG. 11 is a graph illustrating the relationship between the content S of (311) oriented Ni crystals and the amount of wear of a chip and a disk.

A wear test for Examples 1 to 6 was carried out in a chip-on-disk manner under lubrication to determine the relationship between the content S of the {311} oriented Ni crystals and the amounts of wear on the chip and disk (which will be referred to as a wear amount), thereby providing the results shown in Table 7 and FIG. 11. Conditions for the test were as follows: the material of the disk was an Al-10% by weight of Si alloy; the rotational speed of the disk was 5 m/sec.; the amount of oil supplied was 0.3 ml/min.; the load was 100N; the slide distance was 10 km; and the area of the slide surface of the chip made from the slide surface construction was 1 cm². Each of the reported wear amounts is a decrement (mg) per area (1 cm²) of the disk and chip.

TABLE 7

|  |  | Wear amount (mg) |
| --- | --- | --- |
| Example 1) | chip | 0.4 |
|  | disk | 0.8 |
| Example 2) | chip | 0.4 |
|  | disk | 0.8 |
| Example 3) | chip | 0.4 |
|  | disk | 0.8 |
| Example 4) | chip | 0.35 |
|  | disk | 0.9 |
| Example 5) | chip | 0.3 |
|  | disk | 1.1 |
| Example 6) | chip | 0.3 |
|  | disk | 1.2 |

FIG. 11 is a graph taken from Table 7, wherein points (1) to (6) correspond to the chips in Examples 1 to 6, respectively.

As apparent from Table 7 and FIG. 11, the chips in Examples 1 to 4 with the content S of the {311} oriented Ni crystals being in a range represented by $S \geq 40\%$, were worn by an amount slightly larger than those of the chips in Examples 5 and 6. However, they still have a relatively good wear resistance, and moreover, they have a characteristic that the wear of the disk, which was the mating member, was suppressed significantly.

The wear test was carried out under lubrication, but even in a wear test under non-lubrication, substantially the same tendency as in the wear test under lubrication was observed. Conditions for the wear test under non-lubrication were as follows: the material of the disk was an Al-10% by weight of Si alloy; the rotational speed of the disk was 0.5 m/sec.; the load was 100N; the slide distance was 1 km; and the area of the slide surface of the chip made from the slide surface construction was 1 cm². The wear amount was as described above.

In the metal crystals having the face-centered cubic structure, the crystal shape on the slide surface, crystal planes located on the slants, and the like for the oriented metal crystals are shown in Table 8.

TABLE 8

Figure 12:
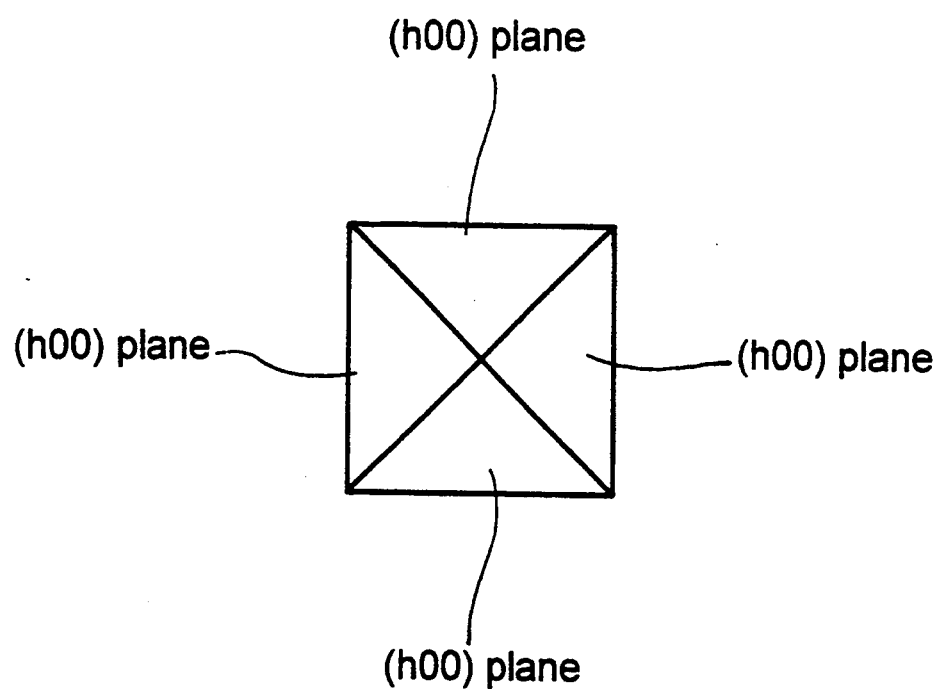
FIG. 12 is a plan view illustrating crystal planes located on slants in one example of a quadrangular pyramid-shaped tip end portion.
Figure 13:
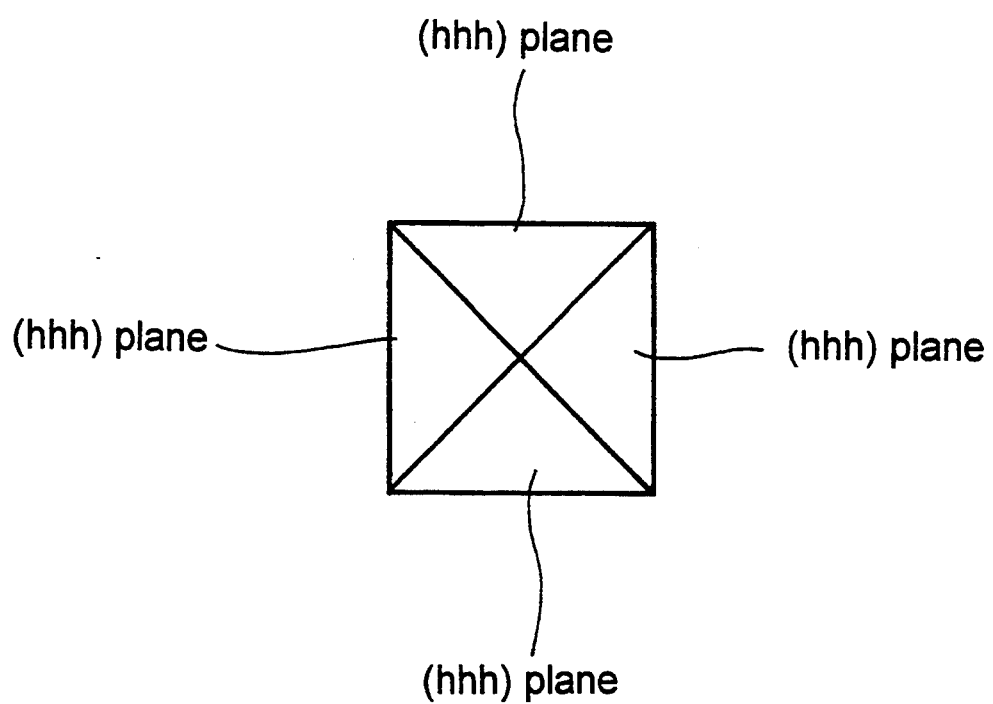
FIG. 13 is a plan view illustrating crystal planes located on slants in another example of a quadrangular pyramid-shaped tip end portion.

| Oriented metal crystal | Crystalline shape on slide surface | Crystal plane located on slant | Characteristic of slant | Referential drawing |
| --- | --- | --- | --- | --- |
| (3hhh) | quadrangular pyramid | (h00) plane ... highly atom-packed plane | good wettability and wear resistance | FIG. 12 |
| (h00) | quadrangular pyramid | (hhh) plane ... close-packed plane | high hardness, excellent wettability and good wear resistance | FIG. 13 |

It should be noted that for the wettability of the crystal planes located on the slants to oil or the like, the (hhh) plane is superior to the (h00) plane.

The slide surface construction of this invention is applicable to a slide portion of any of the following parts of internal combustion engines: pistons (skirt portions, land portions and ring grooves), piston rings, piston pins, connecting rods, crank shafts, bearing metals, oil pump rotors, oil pump rotor housings, springs (end faces), spring seats, spring retainers, cotters, rocker arms, roller bearing outer cases, roller bearing inner cases, valve stems, valve faces, hydraulic tappets, water pump rotor shafts, pulleys, gears, transmission shaft portions, clutch plates, washers, and bolts (bearing surfaces and threaded portions).

What is claimed is:

1. A slide surface construction, which is formed of an aggregate of metal crystals having a face-centered cubic structure, said aggregate including (3hhh) oriented metal crystals with their (3hhh) planes (by Miller indices) oriented toward the slide surface, the content S of said (3hhh) oriented metal crystals being in a range represented by $S \geq 40\%$.

2. A slide surface construction according to claim 1, wherein said metal crystal is a Ni crystal, said (3hhh) plane being a {311} plane, and such {311} oriented Ni crystals being of a quadrangular pyramid shape on said slide surface.

3. A slide surface construction according to claim 1 or 2, wherein said construction has a hardness Hv in a range represented by $Hv \geq 230$.

4. A slide surface construction according to claim 1 or 2, wherein the inclination angle $\theta$ of said (3hhh) plane is set in a range of $0° \leq \theta \leq 15°$.

* * * * *